April 28, 1931.  R. SKUTSCH  1,802,676

BELT TESTING DEVICE

Filed Nov. 15, 1928

Inventor
Rudolf Skutsch,
By D. P. Wolhaupter
Attorney

Patented Apr. 28, 1931

1,802,676

UNITED STATES PATENT OFFICE

RUDOLF SKUTSCH, OF NEUBABELSBERG, GERMANY

BELT-TESTING DEVICE

Application filed November 15, 1928, Serial No. 319,585, and in Germany November 19, 1927.

This invention relates to belt testing devices and has for its object to provide a belt testing device by means of which a sample of a belt may be subjected to the various stresses and strains to which it is subjected in service, and the reactions of the belt recorded, to afford a guide by means of which the practical usefulness of the belt may be predetermined.

With the foregoing general object in view, the invention consists in the novel features of construction, combination and arrangement of parts as will be hereinafter more fully described, illustrated in the accompanying drawings and defined in the appended claims.

In the drawings, wherein like characters of reference denote corresponding parts in related views:—

Figure 1:
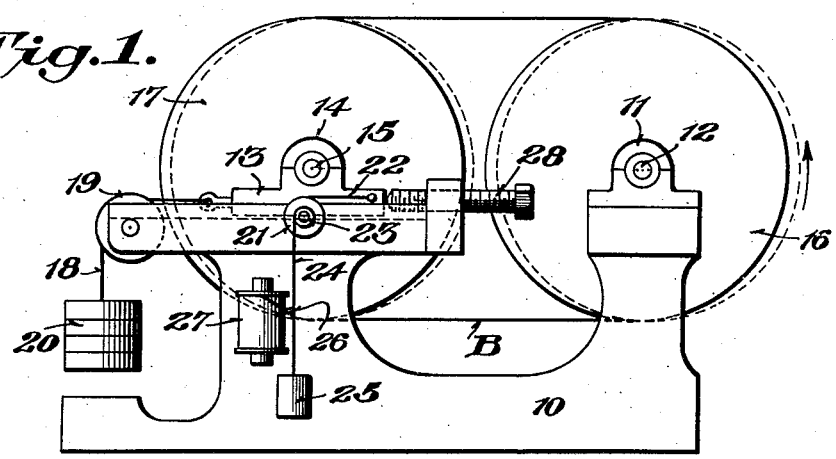
Figure 1 is a side elevation of a belt dynamometer constructed according to one embodiment of the invention.
Figure 3:
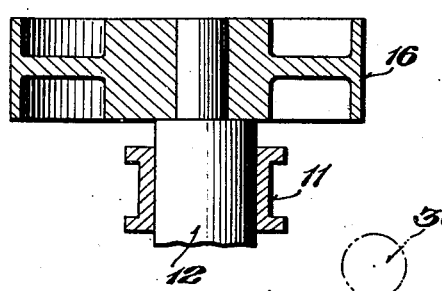
Figure 3 is a detail sectional view illustrating one manner of eccentrically mounting one of the pulleys of the device.
Figure 4:
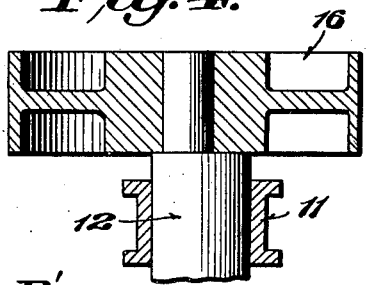
Figure 4 is a view similar to Fig. 3 illustrating an alternative manner of eccentrically mounting one of the pulleys of the device.

Referring first to Figs. 1, 3 and 4 of the drawings 10 designates a base or frame provided at one end with a fixed bearing 11 having a rotatable shaft 12 journaled therein, and at its other end with a slide member 13 carrying a bearing 14 in which is rotatably journaled a shaft 15 disposed parallel to the shaft 12.

Fixed to one of said shafts, the shaft 12 in this instance, eccentrically with respect thereto, is a pulley 16, while fixed to the other of said shafts, concentrically with respect thereto, is a pulley 17, these pulleys being adapted to have trained thereover an endless sample B of the belt to be tested.

Connected with the slide member 13 is a flexible member 18 which passes over a sheave 19 mounted on the frame and is equipped with a weight 20 whereby the slide member 13 is urged constantly in a direction away from the shaft 12, to maintain the belt B taut, said weight being predetermined to place the belt under predetermined tension.

Also connected with the slide member 13 and wound upon a sheave 21 mounted on the frame 10 is a flexible element 22, a smaller sheave 23 being fixed to the sheave 21 and in turn having wound thereon the upper end of a flexible element 24 which is equipped with a weight 25 to maintain both of said flexible elements taut.

Carried by the flexible element 24 is a marker 26 of any suitable type designed for cooperation with a record sheet on the outer face of a drum 27 which is mounted on the frame 10 and adapted to be rotated at a predetermined rate of speed in any suitable manner; for example, by means of a suitable clockwork mechanism which may be enclosed within the drum.

Threaded in the frame 10 for cooperation with the slide member 13 is a screw 28 which is adapted to be progressively adjusted against the slide member 13 as the belt B stretches and said slide member moves outwardly under the influence of the weight 20.

As indicated by Fig. 3 of the drawings, the pulley 12 may have its shaft receiving opening formed eccentrically therein, or, as indicated by Fig. 4 the shaft receiving opening in said pulley may be formed concentrically thereof and the shaft 12 may be provided with an eccentric portion to fit said opening. In either event the pulley will partake of the desired eccentric movement when rotated to alternately slacken the belt A and to place same in tension, thus to simulate conditions of practical use of the belt and to subject same to the various stresses and strains of service conditions.

One or the other of the pulleys is adapted to be driven in any suitable manner to cause travel of the belt over said pulleys with consequent alternate loosening and tightening of the belt as stated. As a consequence the belt is subjected to substantially the same influences that it encounters in service and as the belt stretches the marker 26 records the increase in length of the belt on the recording sheet carried by the drum.

Figure 2:
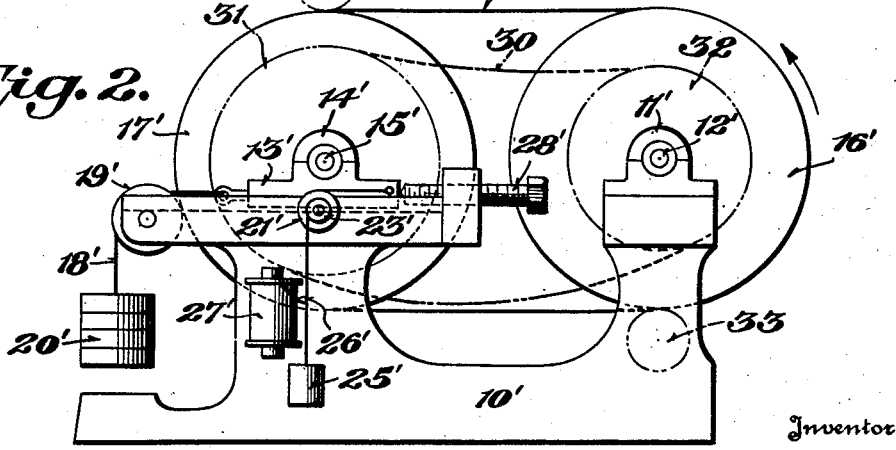
Figure 2 is a view similar to Fig. 1 illustrating another embodiment of the invention.

In the alternative embodiment of the invention illustrated in Fig. 2 of the drawings the structure is substantially the same as illustrated in Fig. 1, the parts in Fig. 2 corresponding to the parts illustrated in Fig. 1 therefore being designated by the same numerals, primed, as are employed to designate the parts in Fig. 1. As distinguished from the embodiment of the invention illustrated in Fig. 1, the pulleys 16′, 17′ of Fig. 2 both are mounted concentrically on their respective shafts, and said pulleys are connected together so as to be driven at different rates of speed by means of a chain 30 trained over sprockets 31 and 32 of different diameters fixed relative to said pulleys, respectively. In addition, thrust rollers 33 may be provided to press the belt B′ against the pulleys 16′, 17′ at the points where, according to the direction of rotation of the pulleys, the belt starts to bend around the latter, thus to assure at all times a maximum area of contact between the belt and the pulleys. According to this embodiment of the invention the belt is caused to slip relative to one or the other or both of the pulleys due to the latter rotating at different rates of speed, thus simulating another condition to which a belt is subjected in service.

Without further description it is thought that the features and advantages of the invention will be readily apparent to those skilled in the art, and it will of course be understood that changes in the form, proportion and minor details of construction may be resorted to, without departing from the spirit of the invention and the scope of the appended claims.

I claim:—

1. A belt testing device comprising a pair of pulleys over which is adapted to be trained a belt to be tested, a slide member on which one of said pulleys is mounted for movement away from the other, at least one of said pulleys being mounted for eccentric rotation, and recording means to indicate movements of said slide member.

2. A belt testing device comprising a pair of pulleys over which is adapted to be trained a belt to be tested, a slide member on which one of said pulleys is mounted for movement away from the other, means whereby rotation of said pulleys subjects the belt to stresses and strains encountered by the belt in service, and recording means to indicate movements of said slide member.

3. A belt testing device comprising a frame, a pulley having a fixed mounting with respect to said frame, a slide member mounted on said frame, a pulley carried by said slide member, said pulleys being adapted to have an endless sample of a belt to be tested trained thereover, means constantly urging said slide member away from said first mentioned pulley, means whereby rotation of said pulleys subjects the belt to stresses and strains encountered by the belt in service, a screw device adapted to be progressively adjusted against said slide member to prevent movement of the latter towards said first mentioned roller, and means to record the outward movement of said slide member as the belt sample stretches.

In testimony whereof I have affixed my signature.

RUDOLF SKUTSCH.